United States Patent [19]

Akutsu et al.

[11] Patent Number: 4,809,596
[45] Date of Patent: Mar. 7, 1989

[54] APPARATUS FOR SWELLING AND DRYING FOODS UNDER REDUCED PRESSURE

[75] Inventors: Shigeru Akutsu, Kanagawa; Yasushi Matsumura; Ryuichi Hattori, both of Osaka, all of Japan

[73] Assignees: House Food Industrial Company Limited, Osaka; Tokuda Seisakusho Co., Ltd., Zama, both of Japan

[21] Appl. No.: 86,629
[22] PCT Filed: Dec. 16, 1986
[86] PCT No.: PCT/JP86/00635
§ 371 Date: Jul. 15, 1987
§ 102(e) Date: Jul. 15, 1987
[87] PCT Pub. No.: WO87/03455
PCT Pub. Date: Jun. 18, 1987

[30] Foreign Application Priority Data

Dec. 16, 1985 [JP] Japan ............... 60-282349

[51] Int. Cl.⁴ ............................................. A23G 3/02
[52] U.S. Cl. .................................. 99/472; 34/15; 34/92; 99/477; 99/483
[58] Field of Search .................. 99/472, 483, 467, 451, 99/473–476, 477, 478, 443 C, 516, 517; 34/5, 10, 15, 92, 17, 26; 62/268; 426/430, 474

[56] References Cited

U.S. PATENT DOCUMENTS

| 3,970,764 | 7/1976 | Karnofsky | 34/10 |
| 4,058,904 | 11/1977 | Takida et al. | 34/15 X |
| 4,127,947 | 12/1978 | Webb et al. | 34/15 X |
| 4,520,574 | 6/1985 | Sugisawa et al. | |
| 4,645,698 | 2/1987 | Matsubara | 99/467 X |

FOREIGN PATENT DOCUMENTS 60-120973 6/1985 Japan.

Primary Examiner—Timothy F. Simone
Attorney, Agent, or Firm—Oblon, Fisher, Spivak, McClelland & Maier

[57] ABSTRACT

An apparatus for swelling and drying foods under reduced pressure in which the apparatus comprises a reduced pressure treating chamber connected to a vacuum pump directly or through a reservoir tank, a drying chamber having a pressure reducing means, a heating means and a conveying means, and an outlet chamber having a pressure reducing means and in which said reduced pressure treating chamber, said drying chamber and said outlet chamber are continuously arranged in this order.

7 Claims, 4 Drawing Sheets

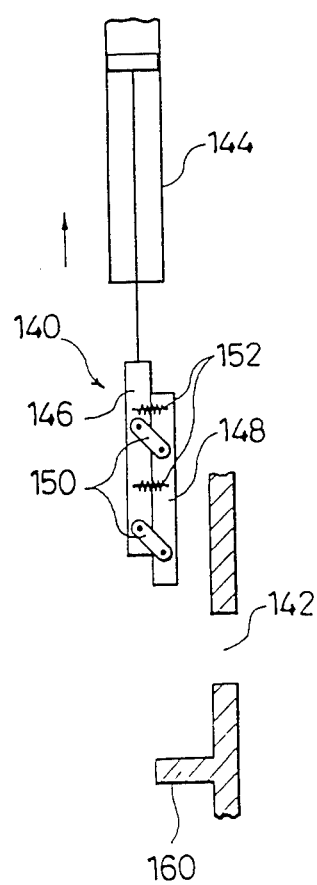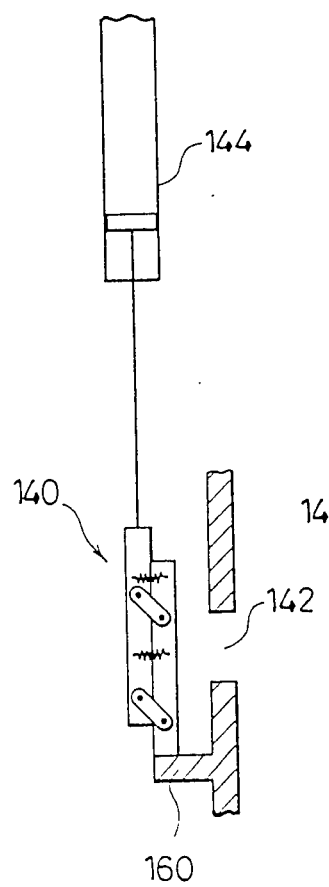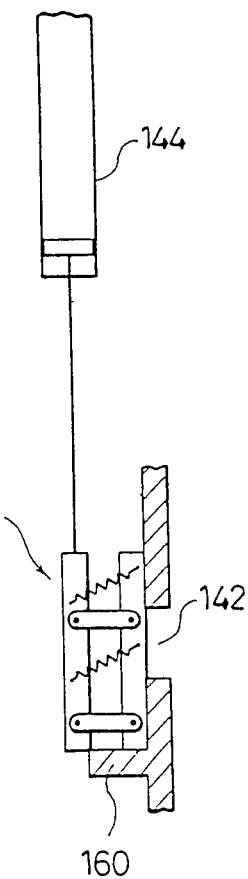

APPARATUS FOR SWELLING AND DRYING FOODS UNDER REDUCED PRESSURE

TECHNICAL FIELD

This invention relates to an apparatus for swelling and drying foods under reduced pressure (hereinafter called "a reduced pressure swelling and drying apparatus") and more particularly to a reduced pressure swelling and drying apparatus which can continuously manufacture dried foods such as snack foods having a crispy feeling pleasant to the palate or foods of which the original palete feeling can be restored in a short time by means of boiling water.

BACKGROUND ART

There has been proposed a dried food manufacturing apparatus, for example, such as that disclosed in Japanese Patent Public Disclosure No. 120973/1985. This apparatus is so constructed that foods to be dried are introduced into a chamber of reduced pressure and dried by an extreme infrared radiation heating apparatus. However, since a vacuum pump is not arranged in each of an inlet chamber, a drying chamber and an outlet chamber, it is impossible to continuously and effectively carry out the reduced pressure drying treatment of foods.

In addition, the above mentioned apparatus is so constructed that the water vapor derived from foods is introduced into the vacuum pump by a ventilating fan mounted in the heating apparatus at an upper portion thereof in order to expel the water vapor from the drying chamber. However, since the ventilating fan does not operate when the pressure within the drying chamber is reduced below 50 torr, the vaporizing rate of water contained in foods to be dried is reduced and therefore the drying effect is also lowered.

There are other known dried food manufacturing apparatuses, for example, such as disclosed in Japanese Patent Public Disclosure Nos. 31659/1984, 156272/1984 and 156273/1984. However, all of these apparatus esare formed as batch types and therefore it is impossible to carry out the continuous drying treatment of foods, and they adopt a single-stage pressure reduction system in which a vacuum chamber (a reservoir tank) is connected to the drying chamber. Accordingly, it is impossible to carry out the reduced pressure heating treatment in the drying chamber during evacuation of the vacuum chamber.

It is an object of the present invention to provide a reduced pressure swelling and drying apparatus which is able to continuously carry out the reduced pressure drying of foods and to eliminate the above mentioned problems of the prior art.

It is another object of the present invention to provide a reduced pressure swelling and drying apparatus which is able to effectively carry out the evacuation of the reduced pressure drying chamber.

It is still another object of the present invention to provide a reduced pressure swelling and drying apparatus which is able to simply and effectively carry out the drying of foods in the drying chamber.

DISCLOSURE OF THE INVENTION

The characteristic feature of the present invention for achieving the above mentioned objects resides in that the apparatus comprises a reduced pressure treating chamber connected to a vacuum pump directly or through a reservoir tank, a drying chamber having a pressure reducing means, a heating means and a conveying means, and an outlet chamber having a pressure reducing means, and in that the reduced pressure treating chamber, the drying chamber and the outlet chamber are continuously arranged in this order.

BRIEF DESCRIPTION OF THE DRAWINGS

FIG. 7(a) through FIG. 7(c) are explanatory views for explaining the structure and action of the gate valve.

BEST MODE FOR CARRYING OUT THE INVENTION

Figure 1:
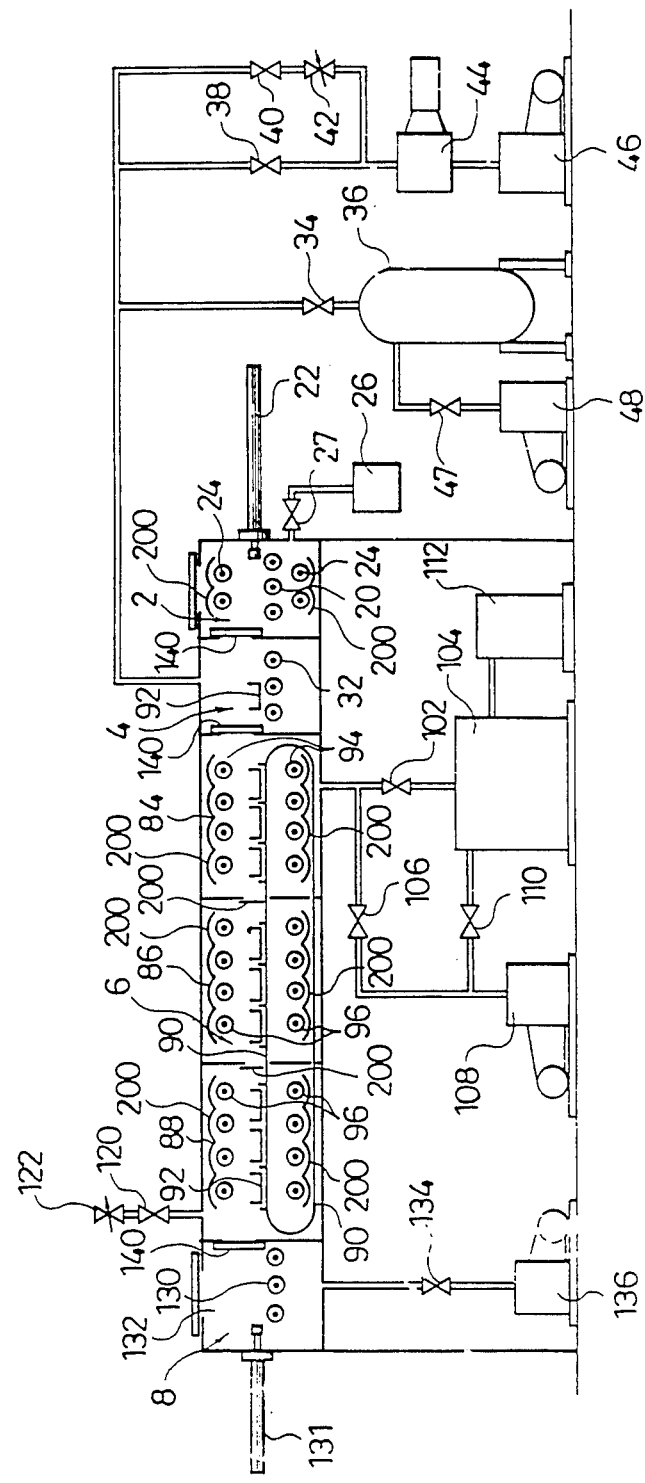
FIG. 1 shows one embodiment of the apparatus of the present invention explaining a fundamental principal thereof.
Figure 2:
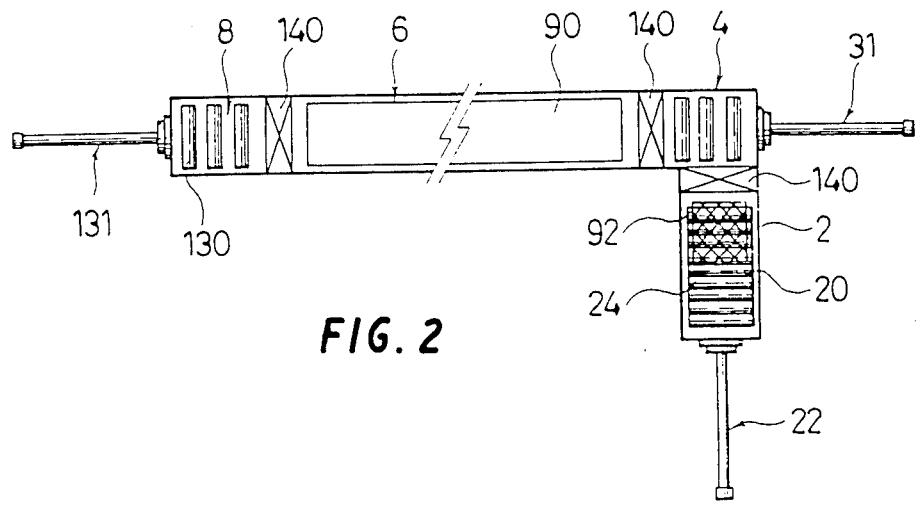
FIG. 2 is the other embodiment of the present apparatus showing another arrangement thereof.

The embodiment of the present invention will now be explained. As shown in FIG. 1, the reduced pressure swelling and drying apparatus of the present invention has a preparatory heating chamber 2, a food treating chamber 4 under reduced pressure (hereinafter called as "reduced pressure treating chamber") arranged adjacent to the preparatory heating chamber 2, a drying chamber 6 arranged adjacent to the reduced pressure treating chamber 4 and an outlet chamber 8 for taking out the finished dry foods from the apparatus arranged adjacent to the drying chamber 6. According to the embodiment shown in FIG. 1, it is shown that the transferring direction of the food to be dried is in a straight line not only in the reduced pressure treating chamber 4, the drying chamber 6 and the outlet chamber 8 but also in the preparatory heating chamber 2. However, it is preferable to arrange the preparatory heating chamber 2 so that the transferring direction of the foods passing therethrough crosses perpendicularly to the transferring direction through the chambers 4, 6 and 8 as shown in FIG. 2.

The preparatory heating chamber 2 has rollers 20 for carrying trays 92 on which the foods to be dried are laid, an air cylinder means 22 for pushing the trays 92 forward, heaters 24 positioned at upper and lower sides of the rollers 20 for heating the foods and a humidifying means 26. Pressure reduction in the preparatory heating chamber 2 is not necessarily required. The heater 24 may be an apparatus for radiating electromagnetic waves such as extreme infrared rays or a heating mechanism utilizing microwaves. When utilizing an apparatus for radiating extreme infrared rays, it is preferable to put a plurality of small heat source elements in a side by side relationship or to adopt flat-shaped heat source elements. It is preferable that the heating apparatus has enough capacity to raise the temperature of the ambient atmosphere around the foods to 150° C. and the temperature of the heat source elements to 300° C.

The humidifying means 26 may be a water vapor generating apparatus of ultrasonic type and the humidity is controlled by adjusting the opening of a valve 27 or by intermittently opening and closing the valve 27 with a timer (not shown). The humidifying means 26 also has a plurality of water vapor nozzles (not shown) for achieving even moistening and water vapor conducting pipes (not shown) are heated for preventing water droplets accumulating on the foods.

The function of the preparatory heating chamber 2 is to raise the temperature of the foods to be treated and to soften the tissue of the foods to make it possible to rapidly vaporize the water contained in the foods at the following reduced pressure treatment and to increase the degree of swelling of the foods. Especially, the humidifying means 26 is able to effectively prevent the reduction of swelling efficiency which would be caused in the following reduced pressure treatment if the surfaces of foods are dried.

The reduced pressure treating chamber 4 has an air cylinder means 31 (for example, as shown in FIG. 2) for pushing the trays 92 forward and a plurality of rollers 32 for sliding the trays 92 and is connected to a reservoir tank 36 through a valve 34. The reduced pressure treating chamber 4 is also connected to an oil lubricated type rotary vacuum pump 46 through a parallel pipeline comprising valves 38 and 40 and a control valve 42 and a mechanical booster 44. The reservoir tank 36 is connected to another oil lubricated type rotary vacuum pump 48 through a valve 47.

It is possible to carry out a rapid pressure reduction treatment in the reduced pressure treating chamber 4 by the provision of the reservoir tank 36 and it is also possible to efficiently swell the foods by rapid water evaporation. In addition, it is possible to carry out the pressure reduction at a desired pressure reduction speed without interruption even during preparation for evacuating the reservoir tank 36 and therefore to improve the manufacturing efficiency, since the reduced pressure treating chamber 4 is connected to the vacuum pump 46 through the mechanical booster 44. In fact, it is preferable to reduce the pressure in the chamber 4 to lower than 0.1 torr and to so construct the chamber 4 that the pressure therein reaches 0.5 torr within one minute after the connection of the chamber 4 to the reservoir tank 36.

Figure 3:
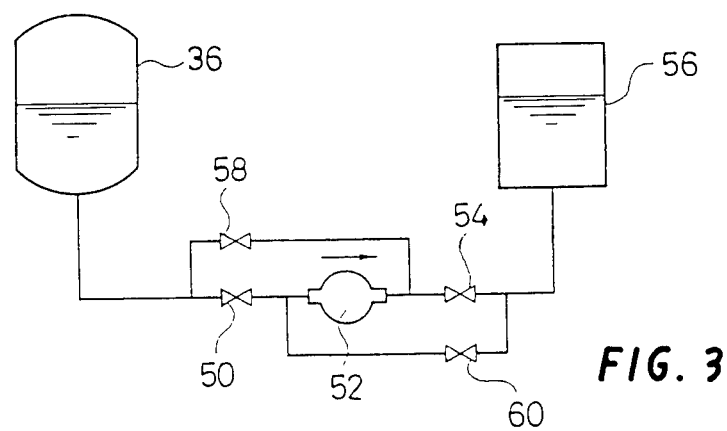
FIG. 3 shows a pipeline arrangement of the control system of the reservoir tank.

The reservoir tank 36 is an effective volume variable type which can change the effective volume of the inside space of the tank 36 by changing the volume of oil contained therein. Due to control of the effective volume of the reservoir tank 36, a desired degree of pressure reduction and pressure reduction speed in the chamber 4 can be obtained. As shown in FIG. 3, the reservoir tank 36 is connected to an oil tank 56 through a valve 50, an oil pump 52 and a valve 54. In addition, a valve 58 is connected to the valve 50 and the oil pump 52 in parallel therewith and a valve 60 is also connected to the oil pump 52 and the valve 54 in parallel therewith. The oil pump 52 acts to supply oil in a direction from the valve 50 to the valve 54. The range of effective volume variation in the reservoir tank 36 relative to the whole volume of the reduced pressure treating chamber 4 is preferably within 1:70–1:5. However, a range of 1:70–1:20 may be used for normal operation.

The effective volume of the reservoir tank 36 is increased by operating the oil pump 52 with the valves 50 and 54 opened and simultaneously with the valves 58 and 60 closed. On the contrary, the effective volume of the reservoir tank 36 is reduced by operating the oil pump 52 with the valves 50 and 54 closed simultaneously with the valves 58 and 60 opened.

Figure 4A:
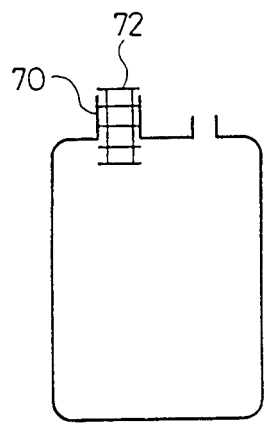
FIG. 4(a) is a cross-sectional view of the baffle structure of a first example.
Figure 4B:
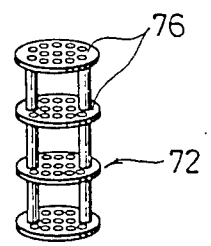
FIG. 4(b) is a perspective view of the baffle structure of FIG. 4(a)
Figure 5A:
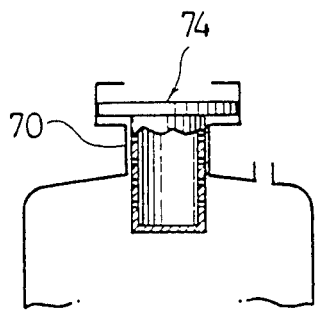
FIG. 5(a) is a partial cross-sectional view of the baffle structure of a second example.
Figure 5B:
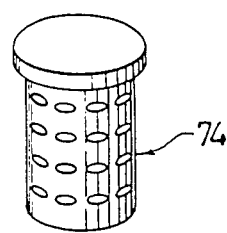
FIG. 5(b) is a perspective view of the baffle structure of FIG. 5(a)

As shown in FIGS. 4(a) and (b) and FIGS. 5(a) and (b), a baffle structure 72 or 74 is attached to the reservoir tank 36 at an inlet 70 thereof connected to the valve 34. The baffle structure 72 is constructed by multi-stage disc plates 76 in which a plurality of openings are formed and the baffle structure 74 is constructed by a cylindrical member in which a plurality of openings are formed. These baffle structures 72 and 74 prevent oil droplets in the reservoir tank 36 entering the pipe lines or the reduced pressure treating chamber 4 when the pressure in the chamber 4 is rapidly reduced. Similar effects can be obtained, without the provision of any baffles, by directing the end portion of the evacuating pipe in the reservoir tank 36 away from the oil surface therein.

Figure 6:
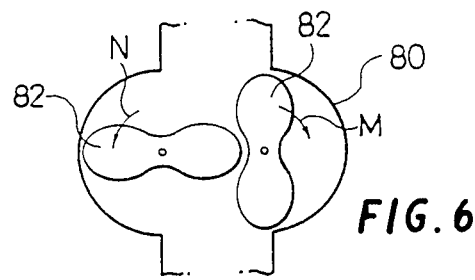
FIG. 6 is an explanatory view of the mechanical booster.

As shown in FIG. 6, the mechanical booster 44 is composed of a housing 80 and two lobe-shaped rotors 82 rotatably mounted in the housing 80. With the rotation of the rotors 82 in the respective directions of the arrows M and N, the air introduced into an upper side of the housing 80 is exhausted from a lower side thereof. The mechanical booster 44 can be operated by a motor of relatively low capacity as compared with an oil lubricating type rotary pump and has a superior exhausting performance especially below 30 torr pressure.

As shown in FIG. 1, the drying chamber 6 is composed of a first compartment 84, a second compartment 86 and a third compartment 88 and a conveying means 90 of an endless belt is arranged passing through these compartments 84, 86 and 88. In each of the compartments 84, 86 and 88, three trays 92 for foods are laid on the upper running portion of the conveying means 90. Extreme infrared heaters 94 and 96 are arranged at upper and lower sides of the upper running portion of the conveying means 90 within the compartments 84, 86 and 88.

A cold trap 104 is connected to the first compartment 84 through a valve 102 and a vacuum pump 108 is also connected to the first compartment 84 through a valve 106. The cold trap 104 and the vacuum pump 108 are connected to each other through a valve 110 and a refrigerator 112 is connected to a cooling portion (not shown) of the cold trap 104. Accordingly, the vacuum pump 108 can evacuate the drying chamber 6 through the cold trap 104 or directly, i.e. not through the cold trap 104.

A control valve 122 is connected to the third compartment 88 through a gas introducing valve 120. By opening the gas introducing valve 120 and controlling the amount of gas introduction with the control valve 122, it is possible to leak the atmospheric air into the drying chamber 6 so that the pressure in the compartments becomes a desired pressure and it is also possible to expel the water vapor generated from the foods from the drying chamber 6, taking the vapor along with the introduced air stream.

It is preferable, for achieving independent thermal control of each compartment, to provide reflectors 200 at each boundary between the first and second compartments 84 and 86 and between the second and third compartments 86 and 88. Each reflector 200 may be so formed that it usually closes a passage gate for trays 92 formed at the boundary due to the action of gravity and is displaced by the trays 92 to open the passage gate when the trays 92 pass therethrough.

The outlet chamber 8 has a plurality of rollers 130 positioned on an extension of the conveying means 90 and is provided with an air cylinder means 131 at a side wall thereof for taking out the trays 92 from the conveying means 90 and is further provided with a lid-closable opening 132 for taking out the trays 92 from the outlet chamber. Since a vacuum pump 136 is connected to the outlet chamber 8 through a valve 134 at a bottom wall thereof, independent evacuation of the outlet chamber 8 is obtainable.

Gate valves 140 each having the same structure are mounted on each boundary between the preparatory heating chamber 2 and the reduced pressure treating chamber 4, between the reduced pressure treating chamber 4 and the drying chamber 6 and also between the drying chamber 6 and the outlet chamber 8. As shown in FIG. 7, the gate valve 140 is intended to sealingly close each gate 142 and is composed of a driving plate 146 mounted on the extension 144 of the cylinder means and a closing plate 148 movably attached to the driving plate 146. The closing plate 148 is connected to the driving plate 146 through links 150 forming a parallelogram link mechanism together with the driving plate 146 and the closing plate 148. In addition, the closing plate 148 is usually urged toward the driving plate 146 by springs 152.

The lower end of the closing plate 148 extends beyond the lower end of the driving plate 146 in the urged position of the closing plate 148, as shown in FIG. 7 (a). The air cylinder means is so positioned that its extension 144 reciprocates in a vertical plane apart from the gate 142. When the air cylinder means is in a retracted position as shown in FIG. 7(a), the lower end of the closing plate 148 takes a position completely apart from a bottom wall 160 of the chambers and therefore the driving plate 146 and the closing plate 148 are contacted with each other. Then, when the air cylinder means is extended to a position as shown in FIG. 7(b), the lower end of the closing plate 148 is contacted with the bottom wall 160. However, the closing plate 148 is still in a position apart from the gate 142.

Finally, when the air cylinder means is extended to its maximum extended position as shown in FIG. 7(c), not only the lower end of the closing plate 148 but also the lower end of the driving plate 146 contact with the bottom wall 160, and therefore the links 150 are moved toward a horizontal position against the urging force of the springs 152. Thus, the closing plate 148 is completely pressed against the gate 142 and tightly closes the gate 142.

Under such a construction of the gate valve 140, there is a risk that the trays 92 will be crushed by the gate valve 140 if the trays 92 unexpectedly pass near the gate 142 during the closing motion of the gate valve 140. In order to avoid this problem, it is preferable to arrange an apparatus for detecting the presence of trays 92 such as a photoelectric switch or a limit switch at a region near the gate 142 and for stopping the closing motion of the gate valve 140 when the apparatus detects the presence of trays 92.

In addition, there is a risk that the foods in the chambers will be blown off if the gate valve 140 is opened while there is a large pressure difference between mutually adjacent chambers, since the thermal control and the pressure control in the preparatory heating chamber 2, the reduced pressure treating chamber 4, the drying chamber 6 and the outlet chamber 8 are carried out independently. In order to avoid this problem, it is preferable to so control the gate valve 140 that it stops its opening motion when a pressure difference exceeding a predetermined value between mutually adjacent chambers is detected by a pressure difference detecting apparatus arranged in the chambers.

According to the reduced pressure swelling and drying apparatus of the present invention, it is able to continuously manufacture the dried foods by efficiently swelling and drying the raw foods.

Furthermore, according to the present invention, it is able to efficiently evacuate the reduced pressure treating chamber and also to easily and efficiently dry the raw foods in the drying chamber.

Still furthermore, according to the present invention, it is able to incorporate the preparatory heating chamber having the heating means and the humidifying means into the pressure reduction means without any trouble and to efficiently carry out the reduced pressure swelling of foods for manufacturing the dried foods of high quality.

We claim:

1. An apparatus for swelling and drying foods under reduced pressure, comprising:
   first, second, and third pressure reducing means,
   a reduced pressure treatment chamber connected to the first pressure reducing means for keeping the foods in a reduced pressure environment,
   a drying chamber having a conveyor for drying the foods by heating and reducing pressure, said drying chamber being connected to the second pressure reducing means, and
   an outlet chamber connected to the third pressure reducing means,
   wherein the reduced pressure treatment chamber, the drying chamber and the outlet chamber are arranged in the recited order.

2. The apparatus as defined in claim 1, wherein said heating means is an electromagnetic wave radiating apparatus.

3. The apparatus as defined in claim 1, wherein said reduced pressure treating chamber and said drying chamber as well as said drying chamber and said outlet chamber are connected to each other through gate valves.

4. The apparatus as defined in claim 1, wherein said drying chamber has a gas introducing means.

5. The apparatus as defined in claim 1, wherein a reservoir tank is provided between the reduced pressure treatment chamber and the first pressure reducing means to carry out quickly reduced pressure treatment.

6. The apparatus as defined in claim 1, wherein the reduced pressure treating chamber is connected to the vacuum pump through a reservoir tank.

7. The apparatus as defined in claim 6, wherein the reservoir tank has a cylindrical baffle.

* * * * *